US012146318B2

(12) United States Patent
Krarti (10) Patent No.: US 12,146,318 B2
(45) Date of Patent: Nov. 19, 2024

(54) SWITCHABLE PHASE CHANGE MATERIAL SYSTEMS FOR BUILDING ENVELOPES

(71) Applicant: The Regents of the University of Colorado, a body corporate, Denver, CO (US)

(72) Inventor: Moncef Krarti, Longmont, CO (US)

(73) Assignee: The Regents of the University of Colorado, a body corporate, Denver, CO (US)

(*) Notice: Subject to any disclaimer, the term of this patent is extended or adjusted under 35 U.S.C. 154(b) by 7 days.

(21) Appl. No.: 17/511,080

(22) Filed: Oct. 26, 2021

(65) Prior Publication Data

US 2022/0127843 A1 Apr. 28, 2022

Related U.S. Application Data

(60) Provisional application No. 63/105,549, filed on Oct. 26, 2020.

(51) Int. Cl.
*F28D 20/02* (2006.01)
*E04B 1/76* (2006.01)
(Continued)

(52) U.S. Cl.
CPC .......... *E04B 1/7612* (2013.01); *F28D 20/023* (2013.01); *E04B 2001/742* (2013.01)

(58) Field of Classification Search
CPC ............. F24F 2005/0064; F24F 5/0046; F24F 5/0021; F24F 11/875; F24F 5/0089; F28D 20/02; F28D 20/028; F24S 20/66
See application file for complete search history.

(56) References Cited

U.S. PATENT DOCUMENTS 2,857,634 A * 10/1958 Garbade ................. E04B 7/163
49/82.1
4,212,298 A * 7/1980 Gezari ..................... A61M 5/20
604/143
(Continued)

OTHER PUBLICATIONS

A. Alongi, A. Angelotti, L. Mazzarella, Experimental validation of a steady periodic analytical model for Breathing Walls, Build. Environ. 168 (2020) 106509. https://doi.org/10.1016/j.buildenv.2019.106509.

(Continued)

*Primary Examiner* — David J Teitelbaum
*Assistant Examiner* — Jason N Thompson
(74) *Attorney, Agent, or Firm* — Meunier Carlin & Curfman LLC (57) ABSTRACT

In some aspects, the present disclosure relates to switchable phase change material system (SPCMS). In some embodiments, dynamic, switchable phase change material systems allow building envelope assemblies to store energy from one side and release to the other side in order to reduce thermal loads and peak demands for both space heating and cooling. PCM layers can be coupled with thermal insulation layers to ensure heat does not transfer readily through the building envelope and thus increase thermal heating and cooling loads for the building. In some embodiments of the present disclosure, a combination of rotatable members comprised of PCM and insulation are switchable in position such that layers with PCM are switched from one side to the other without the need to maintain the thermal insulation within a building envelope.

29 Claims, 9 Drawing Sheets

(51) Int. Cl.
| | |
|---|---|
| F24F 5/00 | (2006.01) |
| F24F 11/875 | (2018.01) |
| F24S 20/66 | (2018.01) |
| E04B 1/74 | (2006.01) |

(56) References Cited

U.S. PATENT DOCUMENTS

| | | | | |
|---|---|---|---|---|
| 4,290,416 | A * | 9/1981 | Maloney | F24S 60/10 165/47 |
| 4,337,754 | A * | 7/1982 | Conger | F24S 70/65 126/633 |
| 4,739,749 | A * | 4/1988 | Lindley | A61H 1/0218 606/244 |
| 6,357,512 | B1 * | 3/2002 | Baer | F24S 90/10 126/621 |
| 8,151,788 | B2 * | 4/2012 | Bourne | F24S 20/67 126/569 |
| 9,399,866 | B2 * | 7/2016 | Alawadhi | F28D 20/02 |
| 2016/0320080 | A1 * | 11/2016 | Hieke | F24S 10/50 |

OTHER PUBLICATIONS

A. Berge, C.E. Hagentoft, P. Wahlgren, B. Adl-Zarrabi, Effect from a Variable U- Value in Adaptive Building Components with Controlled Internal Air Pressure, Energy Procedia. 78 (2015) 376-381. https://doi.org/10.1016/j.egypro.2015.11.677.
A.H.A. Dehwah, M. Krarti, Control strategies for switchable roof insulation systems applied to US residential homes, Energy Build. 231 (2021) 110649. https://doi.org/https://doi.org/10.1016/j.enbuild.2020.110649.
A.H.A. Dehwah, M. Krarti, Cost-benefit analysis of retrofitting attic-integrated switchable insulation systems of existing US residential buildings, Energy. 221 (2021) 119840. https://doi.org/https://doi.org/10.1016/j.energy.2021.119840.
A.H.A. Dehwah, M. Krarti, Optimal Control Strategies for Switchable Roof Insulation Systems Applied to US Residential Buildings, J. Eng. Sustain. Bldgs. Cities. 1 (2020) 110649. https://doi.org/10.1115/1.4048561.
Al-Absi, A.A., Isa, M.H.M., and Ismail, M., 2020, Phase change materials (PCMs) and their optimum position in buildings walls, Sustainability, 12, 1294.
ASHRAE, ANSI/ASHRAE/IES. Standard 90.1-2019 Energy Standard for Buildings Except Low-Rise Residential Buildings, American Society of Heating, Refrigeration and Air-Conditioning Engineers, Atlanta, GA, 2019.
B. Park, M. Krarti, Optimal control strategies for hollow core ventilated slab systems, J. Build. Eng. 24 (2019) 100762. https://doi.org/10.1016/j.jobe.2019.100762.
C.J. Meinrenken, A. Mehmani, Concurrent optimization of thermal and electric storage in commercial buildings to reduce operating cost and demand peaks under time-of-use tariffs, Appl. Energy. 254 (2019) 113630. https://doi.org/10.1016/j.apenergy.2019.113630.
D. Olsthoorn, F. Haghighat, A. Moreau, G. Lacroix, Abilities and limitations of thermal mass activation for thermal comfort, peak shifting and shaving: A review, Build. Environ. 118 (2017) 113-127. https://doi.org/10.1016/j.buildenv.2017.03.029.
D.E.M. Bond, W.W. Clark, M. Kimber, Configuring wall layers for improved insulation performance, Appl. Energy. 112 (2013) 235-245. https://doi.org/10.1016/j.apenergy.2013.06.024.
F. Antretter, D.E. Hun, P. Boudreaux, B. Cui, Assessing the Potential of Active Insulation Systems to Reduce Energy Consumption and Enhance Electrical Grid Services, in: ASHRAE 2019 Build. XIV Int. Conf., 2019.
F. Favoino, Q. Jin, M. Overend, Design and control optimisation of adaptive insulation systems for office buildings. Part 1: Adaptive technologies and simulation framework, Energy. 127 (2017) 301-309. https://doi.org/10.1016/j.energy.2017.03.083.
F. Lu, Z. Yu, Y. Zou, X. Yang, Cooling system energy flexibility of a nearly zero-energy office building using building thermal mass: Potential evaluation and parametric analysis, Energy Build. 236 (2021) 110763. https://doi.org/10.1016/j.enbuild.2021.110763.
G.P. Henze, T.H. Le, A.R. Florita, C. Felsmann, Sensitivity analysis of optimal building thermal mass control, J. Sol. Energy Eng. Trans. ASME. 129 (2007) 473-485. https://doi.org/10.1115/1.2770755.
J. Ma, J. Qin, T. Salsbury, P. Xu, Demand reduction in building energy systems based on economic model predictive control, Chem. Eng. Sci. 67 (2012) 92-100. https://doi.org/10.1016/j.ces.2011.07.052.
J. Nelson, G. Henze, Evaluation of the Passive Cooling Potential of Thermal Mass Inherent in Medium to Large Commercial Buildings, J. Archit. Eng. 27 (2021) 04021007. https://doi.org/10.1061/(asce)ae.1943-5568.0000460.
J. Testa, M. Krarti, A review of benefits and limitations of static and switchable cool roof systems, Renew. Sustain. Energy Rev. 77 (2017) 451-460. https://doi.org/10.1016/j.rser.2017.04.030.
J. Yam, Y. Li, Z. Zheng, Nonlinear coupling between thermal mass and natural ventilation in buildings, Int. J. Heat Mass Transf. 46 (2003) 1251-1264. https://doi.org/10.1016/S0017-9310(02)00379-4.
Jin, X., Medina, M.A., and Xhang, X., 2016, Numerical analysis for the optimal location of a thin PCM layer in frame walls, Applied Thermal Engineering, 103, 1057-1063.
K. Menyhart, M. Krarti, Potential energy savings from deployment of Dynamic Insulation Materials for US residential buildings, Build. Environ. 114 (2017) 203- 218. https://doi.org/10.1016/j.buildenv.2016.12.009.
Kalnaes, S.E., and Jelle, B.P., 2015, Phase change materials and products for building applications: A state-of-the-art review and future research opportunities, Energy and Buildings, 94, 150-176.
M. Kimber, W.W. Clark, L. Schaefer, Conceptual analysis and design of a partitioned multifunctional smart insulation, Appl. Energy. 114 (2014) 310-319. https://doi.org/10.1016/j.apenergy.2013.09.067.
M. Krarti, Evaluation of PV integrated sliding-rotating overhangs for US apartment buildings, Appl. Energy. 293 (2021) 116942. https://doi.org/10.1016/j.apenergy.2021.116942.
N. Khaled, M. Krarti, Impact of precooling control on reducing electrical peak demand for commercial buildings in Tuniisia, Proc. Energy Sustain. Conf. 2007. (2007) 565-572. https://doi.org/10.1115/es2007-36112. https://asmedigitalcollection.asme.org/ES/proceedings-abstract/ES2007/47977/565/329187.
P. Xu, Case study of demand shifting with thermal mass in two large commercial buildings, ASHRAE Trans. 115 PART 2 (2009) 586-598.
Q. Jin, F. Favoino, M. Overend, Design and control optimisation of adaptive insulation systems for office buildings. Part 2: A parametric study for a temperate climate, Energy. 127 (2017) 634-649. https://doi.org/10.1016/j.energy.2017.03.096.
R. Tällberg, B.P. Jelle, R. Loonen, T. Gao, M. Hamdy, Comparison of the energy saving potential of adaptive and controllable smart windows: A state-of-the-art review and simulation studies of thermochromic, photochromic and electrochromic technologies, Sol. Energy Mater. Sol. Cells. 200 (2019) 109828. https://doi.org/10.1016/j.solmat.2019.02.041.
R.A. Kishore, M.V.A. Bianchi, C. Booten, J. Vidal, R. Jackson, Modulating thermal load through lightweight residential building walls using thermal energy storage and controlled precooling strategy, Appl. Therm. Eng. 180 (2020) 115870. https://doi.org/10.1016/j.applthermaleng.2020.115870.
S. Morgan, M. Krarti, Impact of electricity rate structures on energy cost savings of precooling controls for office buildings, Build. Environ. 42 (2007) 2810-2818. https://doi.org/10.1016/j.buildenv.2005.11.010.
S.A. Al-Sanea, M.F. Zedan, S.N. Al-Hussain, Effect of thermal mass on performance of insulated building walls and the concept of energy savings potential, Appl. Energy. 89 (2012) 430-442. https://doi.org/10.1016/j.apenergy.2011.08.009.
Soares, N., Costa, J.J., Gaspar, A.R., and Santos, P., 2013, Review of passive PCM latent heat thermal energy storage systems towards buildings' energy efficiency, Energy and Buildings, 59. 82-103.

(56) References Cited

OTHER PUBLICATIONS

T. Pflug, N. Nestle, T. E. Kuhn, M. Siroux, C. Maurer, Modeling of facade elements with switchable U-value, Energy Build. 164 (2018) 1-13. https://doi.org/10.1016/j.enbuild.2017.12.044.

US Department of Energy (DOE), Benefits of Demand Response in Electricity Markets and Recommendations for Achieving Them, 2006. https://www.energy.gov/OE/downloads/benefits-demand-response-electricity-markets-and-recommendations-achieving-them-report.

US Department of Energy (DOE), Commercial Prototype Building Models, Build. Energy Codes Progr. (2020). https://www.energycodes.gov/development/commercial/prototype_models (accessed Mar. 28, 2021).

US Department of Energy (DOE), EnergyPlus EMS Application Guide, 2019.

US Department of Energy (DOE), EnergyPlusTM Version 9.1.0 Documentation: Engineering Reference, 2019.

V. Shekar, M. Krarti, Control strategies for dynamic insulation materials applied to commercial buildings, Energy Build. 154 (2017) 305-320. https://doi.org/10.1016/j.enbuild.2017.08.084.

Y. Chen, P. Xu, J. Gu, F. Schmidt, W. Li, Measures to improve energy demand flexibility in buildings for demand response (DR): A review, Energy Build. 177 (2018) 125-139. https://doi.org/10.1016/j.enbuild.2018.08.003.

Y. Chen, Z. Chen, P. Xu, W. Li, H. Sha, Z. Yang, G. Li, C. Hu, Quantification of electricity flexibility in demand response: Office building case study, Energy. 188 (2019). https://doi.org/10.1016/j.energy.2019.116054.

Y. Luo, L. Zhang, M. Bozlar, Z. Liu, H. Guo, F. Meggers, Active building envelope systems toward renewable and sustainable energy, Renew. Sustain. Energy Rev. 104 (2019) 470-491. https://doi.org/10.1016/j.rser.2019.01.005.

N. Khaled, M. Krarti, Impact of precooling control on reducing electrical peak demand for commercial buildings in Tunisia, Proc. Energy Sustain. Conf. 2007. (2007) 565-572. https://doi.org/10.1115/es2007-36112. https://asmedigitalcollection.asme.org/ES/proceedings-abstract/ES2007/47977/565/329187.

* cited by examiner

SWITCHABLE PHASE CHANGE MATERIAL SYSTEMS FOR BUILDING ENVELOPES

CROSS REFERENCE TO RELATED APPLICATIONS

This application is a non-provisional application claiming priority to U.S. Provisional Application Ser. No. 63/105,549, filed Oct. 26, 2020, which is hereby incorporated by reference in its entirety.

BACKGROUND

The integration of thermal storage materials into a building envelope assembly (e.g., walls, roofs, floors) can enhance energy performance of buildings. The integration of phase change materials (PCM)s into building envelope systems can reduce energy use and peak demand as well as improve thermal comfort, since indoor temperature fluctuations can be reduced [1-4].

The use of static PCM layers coupled with static insulation inside building envelope systems can prevent the exchange of the stored energy between indoors and outdoors and thus may limit the energy efficiency potential of these passive energy storage systems. It is with respect to these and other considerations that certain embodiments of the present disclosure are presented.

SUMMARY

In one aspect, the present disclosure relates to a heat exchange system for a structure. According to principles described herein, the system includes at least one movable panel. The at least one moveable panel has a first side and a second side. A phase change material (PCM) is provided on the first side of the moveable panel, and an insulation material provided on the second side of the moveable panel. An actuator is coupled to the at least one moveable panel, and the at least one movable panel is moveable between a first orientation and a second orientation by operation of the actuator such that the PCM is oriented in a first direction and the insulation material is oriented in a second direction.

In an aspect, the heat exchange system for a structure the first orientation is 180 degrees from the second orientation. In another aspect, the system also includes a frame, wherein the at least one moveable panel is coupled to the frame. In another aspect, the system also includes a rod coupled to the at least one moveable panel, whereby rotation of the rod causes movement of the movable panel between 0 degrees and 180 degrees. The rod may be a central axis of rotation of the moveable panel. The rod may be an edge axis of rotation of the moveable panel.

Any of the embodiments described herein may have a plurality of the moveable panels. Each of moveable panels may have an axis of rotation for moving between the 0 degree orientation and the 180 degree orientation, wherein the axes of rotation of the plurality of moveable panels are generally parallel. The PCM material may be paraffins, fatty acids, and/or hydrated salts.

The system may include an electronic controller coupled to the actuator and configured to control movement of the at least one moveable panel.

In some aspects, the present disclosure relates to dynamic, switchable phase change material (PCM) systems. Among other benefits and advantages provided, switchable PCM systems in accordance with some embodiments of the present disclosure allow building envelope assemblies to store energy from one side and release to the other side in order to reduce thermal loads and peak demands for both space heating and cooling. Moreover, PCM layers can be coupled with thermal insulation layers to ensure heat does not transfer readily through the building envelope and thus increase thermal heating and cooling loads for the building. PCMs used in various embodiments of the present disclosure can be phase change materials suitable for building materials, including, but not limited to paraffins, fatty acids, and hydrated salts.

In some embodiments of the present disclosure, a combination of rotatable members comprised of PCM layers and insulation layers are switchable in position such that the PCM layers are switched from one side to the other without the need to maintain the thermal insulation within a building envelope such as a wall assembly. Dynamic systems in accordance with various embodiments of the present disclosure can significantly reduce annual combined cooling and heating energy use for residential and commercial buildings, for a wide range of climates.

In some aspects, the present disclosure relates to a switchable phase change material system for a building envelope. In some embodiments, the system comprises a rotatable member including a phase change material, disposed in a building envelope. An angular position of the rotatable member is switchable by rotating the rotatable member about a rotation axis, and the angular position is determined at least in part based on considerations that include indoor-outdoor thermal interactions associated with the building envelope.

In some embodiments, the angular position of the rotatable member is switchable by rotating the rotatable member such that the phase change material moves from a first position in which the phase change material faces in a first direction to a second position in which the phase change material faces in a second direction. In some embodiments, the first direction is about 180 degrees from the second direction. In some embodiments, the phase change material comprises at least one of paraffins, fatty acids, and hydrated salts. In some embodiments, the rotatable member comprises at least one layer of phase change material and at least one layer of insulation material.

In some embodiments, the rotatable member is configured to selectively store and release thermal energy. In some embodiments, the angular position of the rotatable member affects at least one of: heating and/or cooling of the building; and energy usage of the building.

In some embodiments, the switchable phase change material system further comprises an actuator coupled to the rotatable member and configured to cause the rotatable member to change the angular position by rotating about the rotation axis.

In some embodiments, the switchable phase change material system further comprises a controller that is configured to control the actuator to cause the actuator to change the angular position of the rotatable member. In some embodiments, the control of the actuator by the controller is determined, at least in part, according to the considerations that include indoor-outdoor thermal interactions associated with the building envelope. In some embodiments, the control of the actuator by the controller is determined, at least in part, according to temperature sensed by temperature sensors associated with the building envelope.

In another aspect, the present disclosure relates to a method of affecting thermal conditions of a building, using a system according to any one of the above-described embodiments.

Other aspects and features according to example embodiments of the present disclosure will become apparent to those of ordinary skill in the art, upon reviewing the following detailed description in conjunction with the accompanying figures and the attached APPENDIX, which is an integral part of the present application.

Additional advantages of the present disclosure will be set forth in part in the description which follows, and in part will be obvious from the description, or may be learned by practice of the present disclosure. The advantages of the present disclosure will be realized and attained by means of the elements and combinations particularly pointed out in the appended claims. It is to be understood that both the foregoing general description and the following detailed description are exemplary and explanatory only and are not restrictive of the present disclosure, as claimed.

DETAILED DESCRIPTION

The present disclosure may be understood more readily by reference to the following detailed description of preferred embodiments of the invention and the Examples included therein and to the Figures and their previous and following description.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

Various aspects of the present disclosure may be still more fully understood from descriptions of some example implementations and corresponding results, which includes the content of the attached APPENDIX. Some experimental data are presented herein for purposes of illustration and should not be construed as limiting the scope of the disclosed technology in any way or excluding any alternative or additional embodiments.

It must also be noted that, as used in the specification and the appended claims, the singular forms "a," "an" and "the" include plural referents unless the context clearly dictates otherwise. Certain values may be expressed in terms of ranges "from" one value "to" another value. When a range is expressed in terms of "from" a particular lower value "to" a particular higher value, or "from" a particular higher value "to" a particular lower value, the range includes the particular lower value and the particular higher value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Figure 1A:
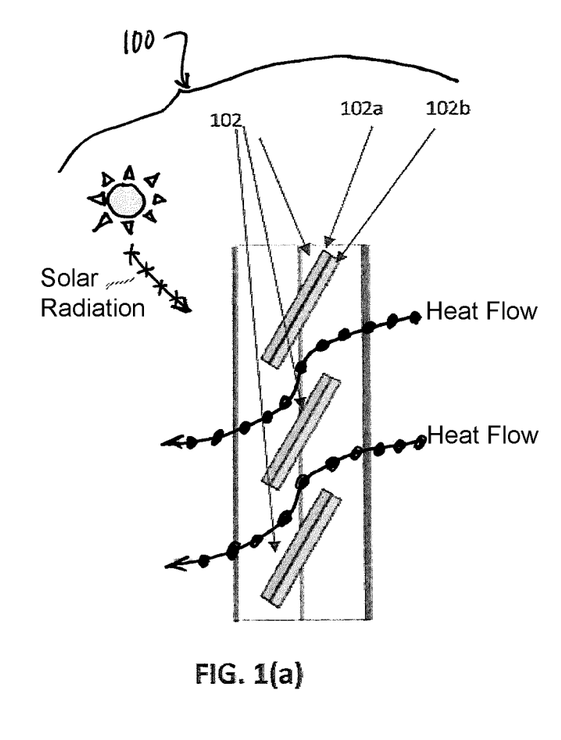
FIG. 1 illustrates a switchable phase change material (PCM) system (SPCMS) in accordance with one embodiment of the present disclosure.
Figure 1B:
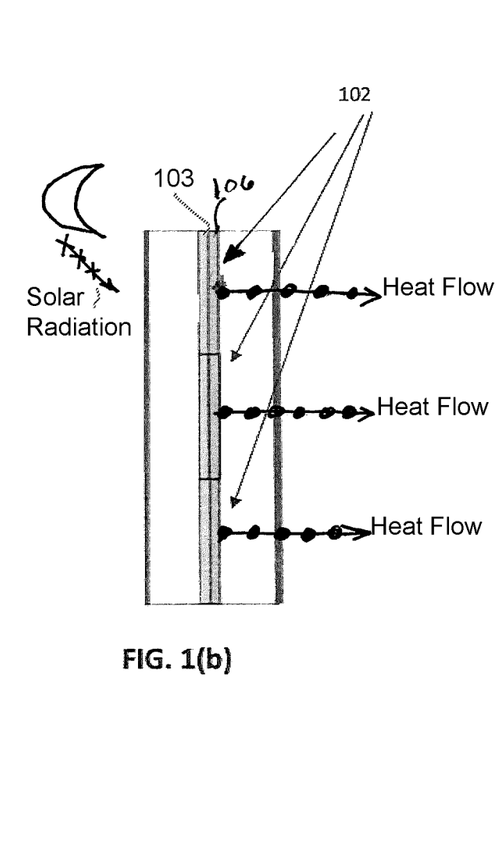

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more components in a device or system does not preclude the presence of additional components or intervening components between those components expressly identified. n some embodiments of the present disclosure, a switchable phase change material system (SPCMS) includes one or more rotatable members that can be placed inside a building envelope assembly (e.g., walls, roofs, and/or floors) for new or existing buildings, including residential and commercial buildings. In some embodiments, the rotatable members include phase change material (PCM) layers that can be combined with insulation layers, and which can be rotated about a rotation axis in a range of angles (e.g., 0 to 180 degrees or more) such that the angular position of the PCM layers can change from facing outside (see FIG. 1(a)) to facing inside (see FIG. 1(b)). In an embodiment wherein the rotatable members are rotated from facing outside to facing inside, the change in angular position can be 180 degrees, for example. The system of FIG. 1 shows three separate sections of rotatable members, which are positioned at a first angle in FIG. 1(a) such that the PCM layers face in a first direction. In FIG. 1(b), the rotatable members have been rotated to a second angle illustrated in FIG. 1(b), such that the PCM layers face in a different, second direction.

Phase change materials (PCMs) used in various embodiments of the present disclosure can be phase change materials suitable for building materials, including, but not limited to, building materials made of paraffins, fatty acids, and hydrated salts. Suitable PCMs should have melting/freezing temperatures in an acceptable range of indoor temperature variations within buildings and should have a high latent heat of fusion as well as a high thermal conductivity. For example, many commonly available PCMs operate in the range of 15-30° C., but any PCM that operates in a desired temperature range may be suitable for use in the present schema. Although described with respect to habitable structures, the application of the present principle is not so limited.

PCMs can be incorporated into panels attached to insulation layers through direct incorporation, immersion, or encapsulation. Commercially available boards or panels enhanced with PCMs may also be used. In addition, commercially available encapsulated PCM systems and material may be used in any of the embodiments illustrated herein. Insulation or insulation layers in some embodiments of the present disclosure that are used with PCMs in accordance with some embodiments, can be thermal insulation suitable for building envelopes, including but not limited to polystyrene, polyurethane, fiberglass, advanced systems vacuum insulation panels (VIPs), nano insulation materials (NIMs), and/or aerogels. One or more actuators, such as mechanical actuators or and/or electrically driven motors, can be used to cause the rotatable members to change angular position by the rotation. The actuator(s) can be coupled to a controller to determine appropriate positions for the rotatable members and to cause the actuators to change the position of the rotatable members based on one or more strategies and approaches that consider, for instance, indoor-outdoor thermal interactions. Such considerations can include whether a thermal control system of a building or structure is in a heating or cooling mode, comparing a temperature outside a first side of a cavity and a temperature outside the second side of a cavity (e.g., cavity of a building envelope), via temperature data obtained through the use of one or more thermal sensors arranged in or around the cavity. Further considerations can include comparing a temperature outside the first side to a setpoint temperature of a heating, ventilation, and air-conditioning (HVAC) system, for instance, and instructing (e.g., via the controller) the actuators to adjust the rotational angle of the rotatable members in response to the heating or cooling mode and the temperature comparisons.

In some embodiments of a switchable phase change material (PCM) system according to the present disclosure, thermal sensors can be used to detect thermal properties and temperatures in, for instance, the building envelope, and such sensors can be coupled to the controller to provide input data for use by the controller in determining the appropriate angular positions (i.e., effective positions for achieving desired thermal conditions) for the rotatable members.

When the rotatable members are facing inside, the PCM layers can receive and store heat gains from the outdoors. This can include ambient air and solar radiation during the daytime, which can be considered the charging phase of the PCM. When the PCM layers are facing inside, the PCM can release heat to the indoors, for example during the nighttime, which can therefore be considered the discharging phase of the PCM.

Figure 1C:
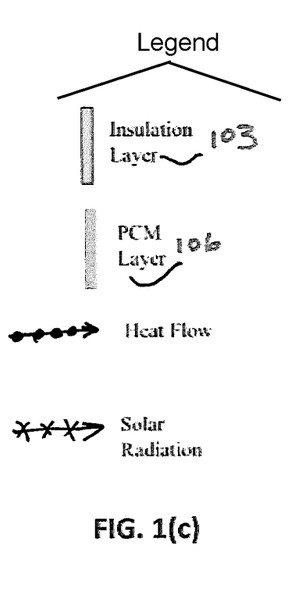

FIG. 1(a) illustrates a PCM system according to one embodiment, in a partially deployed state. This depiction can correspond to a cool day with a high internal heat load. FIG. 1(b) illustrates the PCM system of FIG. 1(a) but in a fully deployed state. This depiction can correspond to a cold night with low internal heat load. FIG. 1(c) provides a legend for the illustrations of FIG. 1(a) and FIG. 1(b), notating the insulation layers 106 and PCM layers 103, and with arrows representing heat flow and solar radiation.

Referring to FIGS. 1(a)-(c), the SPCMS includes movable insulation panels 102. The switchable insulation system 100 can be used in some embodiments of the present disclosure. A portion of wall 104 is shown, and inside the wall 104 are the movable panels 102 with a first side 102a having a PCM material and a second side 102b having an insulation material. The panels 102 can be moved, for example by rotation, to change the effectiveness of the insulation and to move the PCM to an orientation for heat capture or heat release, as needed. In FIG. 1(a), the panels 102 are oriented such that the PCM is pointed toward a heat source (here the sun) to provide maximum amount of heat capture. Whereas, in FIG. 1(b) the panels 102 are oriented such that the PCM may release the captured heat, perhaps to the inside of a building, while the insulation side provides thermal insulation against radiational and conductive cooling, for example, at night, as is illustrated, when the outside temperatures are cooler. It should be understood that embodiments of the present disclosure can adjust the panels 102 to any desired position, in order to obtain insulation and heat transfer values between the maximum and minimum values. It should also be understood that the switchable panels 102 can be installed in parts of the building other than the walls 104, for example in an attic or window shade (not shown).

SPCMS 100 can enhance the energy efficiency of residential buildings. SPCMS 100 used in accordance with example implementations of the present disclosure can use a rotating mechanism that controls the position of panels 102 to make full contact or to create separation, as exemplified in FIGS. 1(a)-1(b). This allows the SPCMS 100 to switch between high thermal resistance value of the insulation side 102b and high heat release of the PCM side 102a during the fully closed configuration (FIG. 1(b)) and low thermal resistance value of the insulation side 102b and high heat collection of the PCM side 102a during the open configuration (FIG. 1(a)). Moreover, the rotating the panels can create openings allowing the air to flow through the wall and attic cavities to decrease their R-value The assembly constructions of the locations in which the panels are installed can dictate the specific low thermal resistance values.

FIGS. 2A-2F illustrate an example structural assembly 200 for an SPCMS according to principles described herein. The assembly 200 includes a plurality of rotatable panels 202, each panel 202 is rotatable about an axis defined by dowel or rod 208. Each panel 102 has a side 202a with a PCM material 203 or encapsulated PCM and another side 202b with a material 206 that has a desired insulation rating, e.g. R value. The panels of the illustrated embodiment as shown in a frame 210, but in an alternative configuration, the panels may be directly built into a building structure.

Figure 2A:
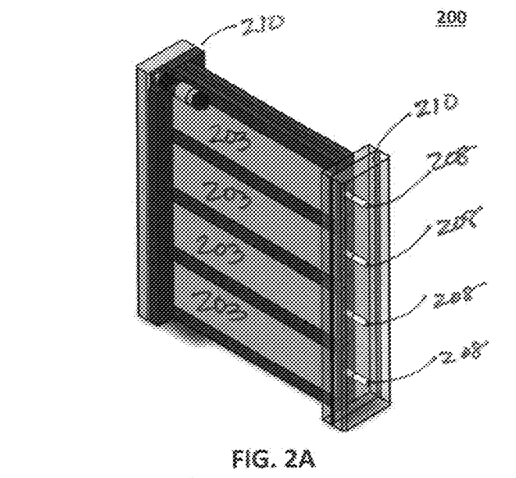
FIGS. 2A-2F illustrate various states of rotation of a SPCMS in accordance with principles described herein.

The assembly 200 includes a plurality of rod/panel pairs such that actuation of the rod causes the panel to change orientation within the assembly 200. For example, as shown in FIG. 2A, the assembly may include two side struts or frame 212 through which ends of the rods pass/extend to be controlled by a control system (not shown). Rotation of the panels 202 is controlled by rotation of the rods 208, e.g., the panels 202 are affixed to the rods 208 or otherwise coupled to the rods 208 such that they rotate together. That said, other mechanisms for controlling the angle of the panels within the assembly 200 are possible, including, for example, a Venetian blind style cord control or other known mechanism. In other words, the SPCMS described herein is not limited by the actual mechanism of the rotation.

In general, panels 202 are designed to rotate 180 degrees from a position in which the PCM material is exposed to a first, e.g., exterior, side to a position in which an insulation material 206 is exposed to the first, exterior side. When the PCM 203 is exposed to the exterior side, the insulation material 206 is exposed to the interior side and vice versa.

Figure 2B:
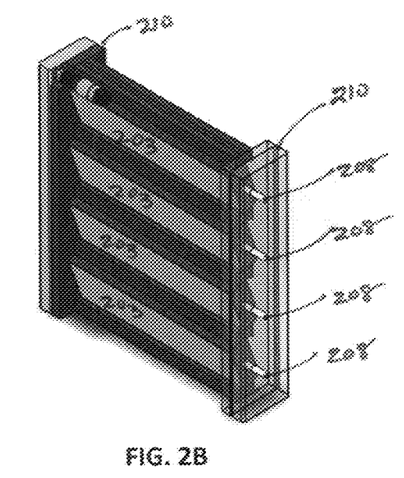
Figure 2C:
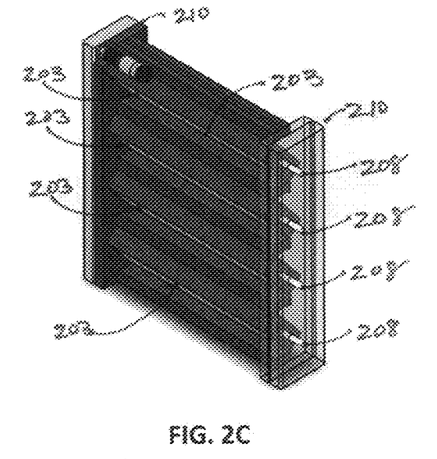
Figure 2D:
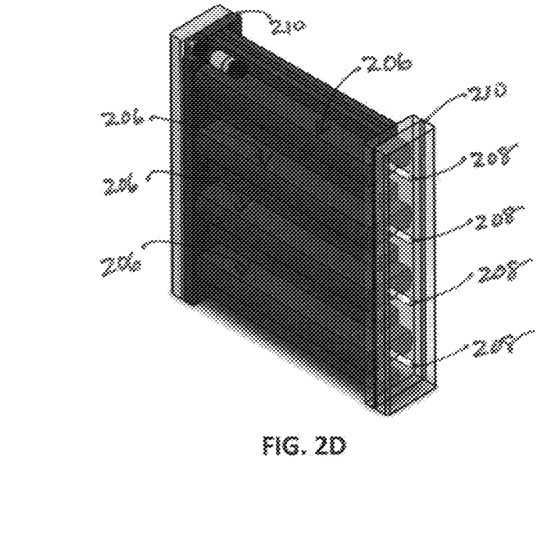
Figure 2E:
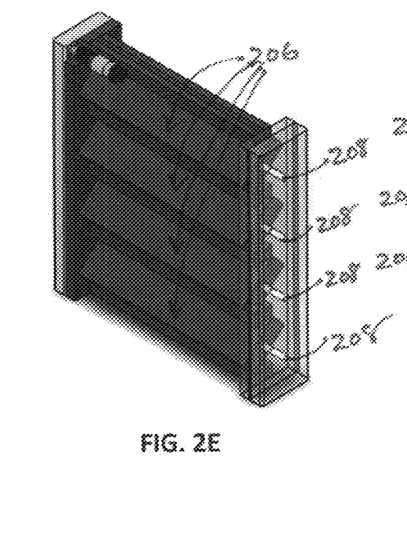
Figure 2F:
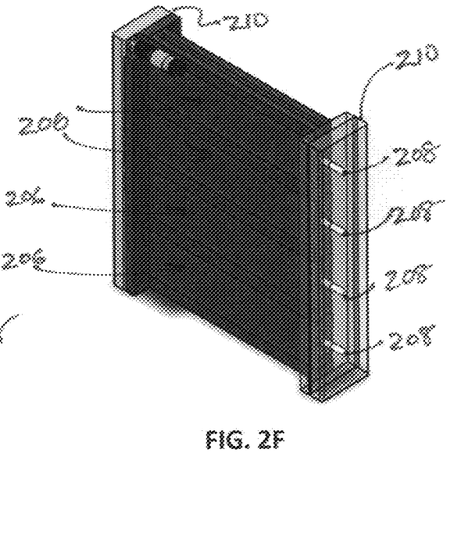

FIG. 2A illustrates the PCM material 203 in a first position, with the insulation material 206 facing away from the reader. FIG. 2B shows the panels 202 partially rotated such that PCM material 203 is partially obstructed from view (e.g., partially shaded from sunlight). FIG. 2C shows further rotation of the panels 202 such that the PCM material 203 is more fully obstructed from view. FIG. 2D shows the panels 202 rotated 90 degrees from the position of FIG. 2A. FIG. 2E shows the panels 202 rotated such that the insulation material faces to the reader. FIG. 2F shows the panels rotated 180 degrees such that the insulation material 206 is fully in view. In another embodiment, a switchable PCM system can be coupled with natural ventilation with air coming from outdoors to indoors using louvers along the outer and inner building envelope assembly. For example, at any point in the rotation, the angle of the panels may provide ventilation from the first side of the panel to the second side of the panel, thus performing as louvres. In another embodiment, a switchable PCM system can be integrated into glazed facades for storing energy during the day and releasing it at night during winter, and for releasing energy during the day and storing it at night during summer.

Figure 3A:
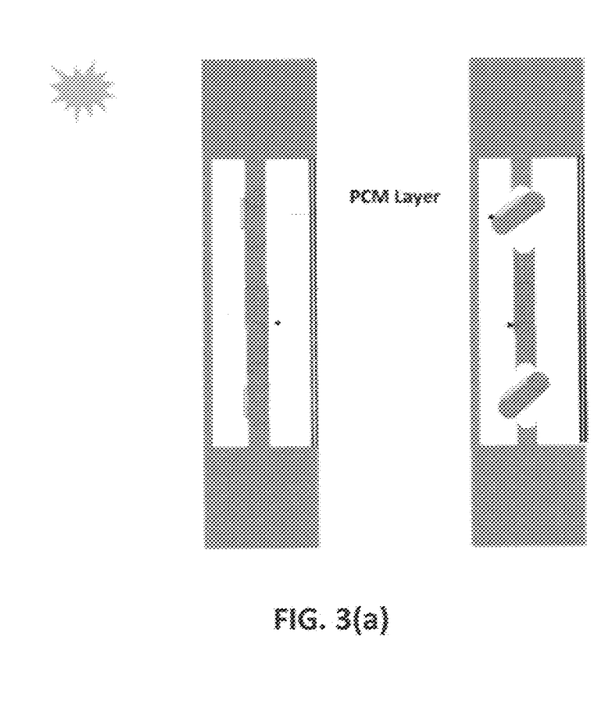
FIGS. 3(a) and 3(b) illustrate a SPCMS in accordance with another embodiment of the present disclosure.
Figure 3B:
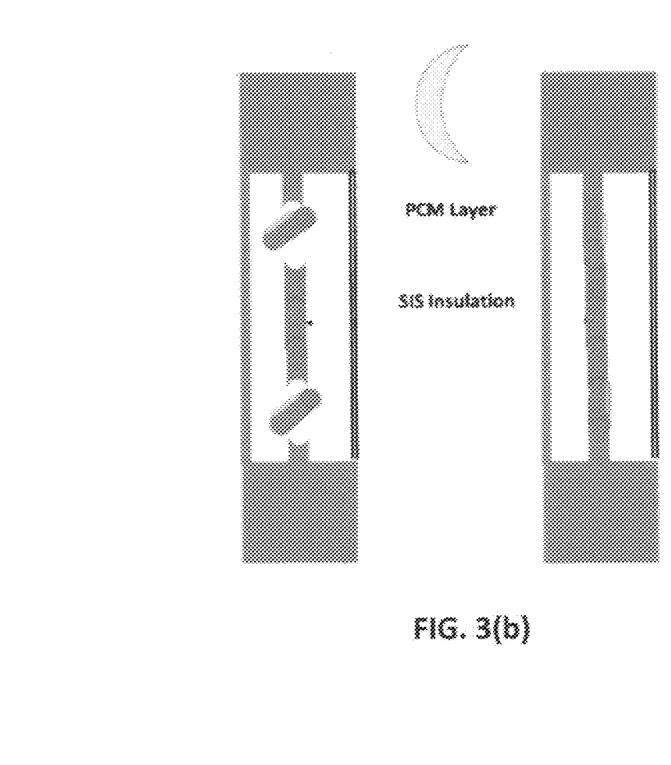

Embodiments of the present disclosure can be used for various applications. In some embodiments of switchable PCM systems in accordance with the present disclosure, combined PCM/insulation layers can be placed only at the top and bottom of building envelope assemblies (e.g., walls or attic) as shown in FIGS. 3(a) and 3(b), depending on the amount of PCM that needs to be integrated in the assembly. In FIG. 3(b), the label "SIS insulation" refers to one or more dynamic insulation systems such as one or more examples of dynamic insulation systems set forth in application PCT/US20/44001 filed Jul. 29, 2020, which is hereby incorporated by reference herein. As illustrated in FIGS. 2(a) and 2(b), a subset of the plurality of panels may have the PCM material, where other panels may be stationary or be rotatable, but not have the PCM material on either side thereof. Although not shown, it may be possible for different PCM material to be used on different panels or different sides of the panels depending on intended heat transfer goals.

Figure 4A:
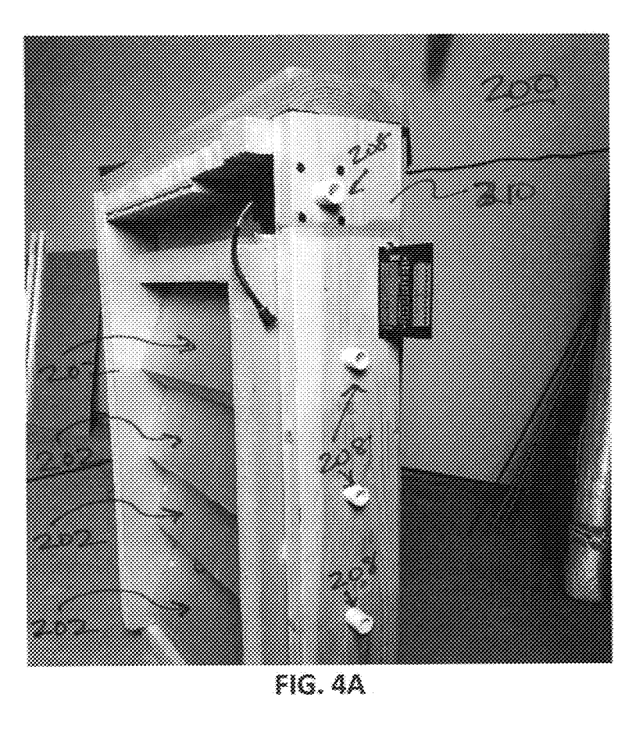
FIGS. 4A and 4B show prototypes of a SPCMS in accordance with the principles described herein.
Figure 4B:
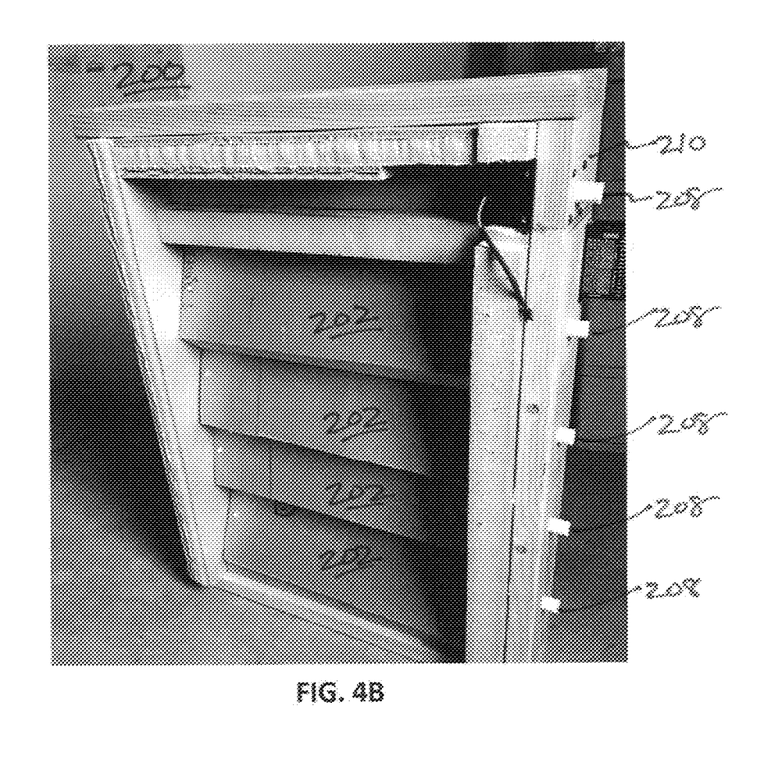

FIGS. 4A and 4B show a prototype SPCMS that has been built according to principles described herein.

Although not shown herein, operation of any of the mechanisms to change the orientation of the panels can be accomplished by any appropriate actuator, such as motor driven rods. In accordance with various embodiments of the present disclosure described herein, an SPCMS can use one or more of AC and DC motors, as well as actuators, connected to a controller, to operate the various example implementations and aspects discussed herein. The controller can perform such operation according to a set of rules and/or through scheduled settings. The same or different motors can be used to drive any movement mechanisms for changing orientation of the panels. The controls can be according to any control scheme and can be controlled manually or automatically, connected to a thermostat, simple timer and/or any other appropriate control mechanisms.

Control schemes to operate the SPCMS, as described in detail in the attached APPENDIX, which is an integral part of the present application and is incorporated herein by reference for all purposes as if fully set forth herein, include temperature-based and optimized strategies. In addition, precooling strategies using building thermal mass are combined with SPCMS controls to achieve load shedding and peak demand shifting. For the temperature-based control schemes, the thermal resistance of SPCMS is switched between high and low values based on a ruleset that considers indoor and outdoor conditions. SPCMS temperature-based control schemes aim at minimizing thermal loads including reduction of heat gains during the cooling season and the same goal to lower heat losses and increase heat gains is set during the heating season. For instance, during the cooling mode, the controller switches the SPCMS' thermal resistance of the overall roof/wall assembly from the default static high R-value setting (RSI-5.5 for roof and RSI-3.2 for walls) to low R-value (RSI-0.3 for roof and RSI-0.4 for walls) if the mean indoor air temperature (IAT) is higher than the roof/wall outside surface temperature ($T_{SO}$). Lowering the thermal resistance of the roof/wall assembly enables the building to benefit from free cooling by rejecting the trapped heat outdoors. Similarly, during the heating mode, the SPCMS' thermal resistance of the roof/wall assembly is set to its low value when the mean indoor air temperature (IAT) is lower than the roof/wall outside surface temperature (Tso) allowing the building to benefit from free heating.

Figure 5A:
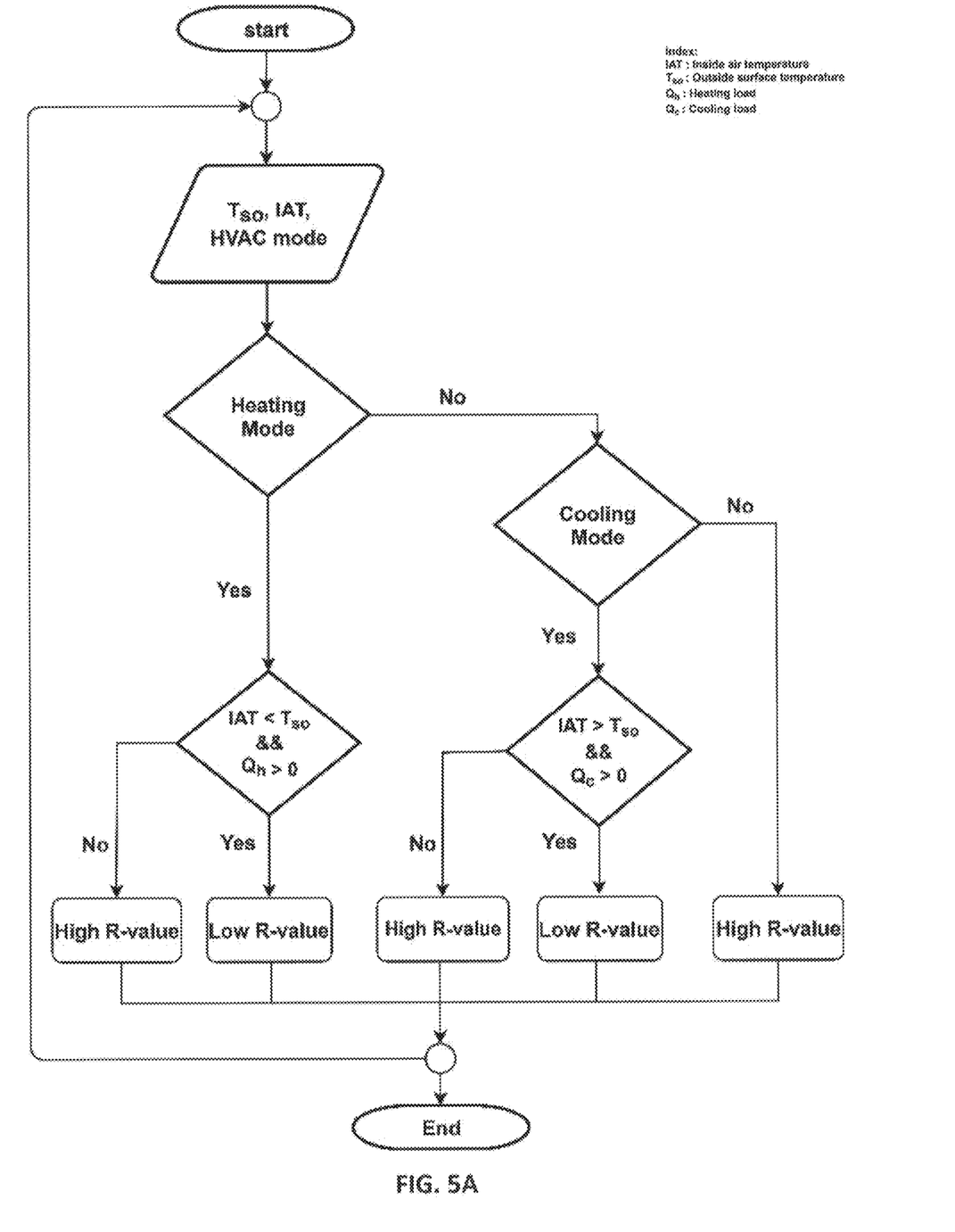
FIGS. 5A and 5B are flow diagrams of temperature-based rulesets for heating and cooling a structure using an SPCMS according to principles described herein.
Figure 5B:
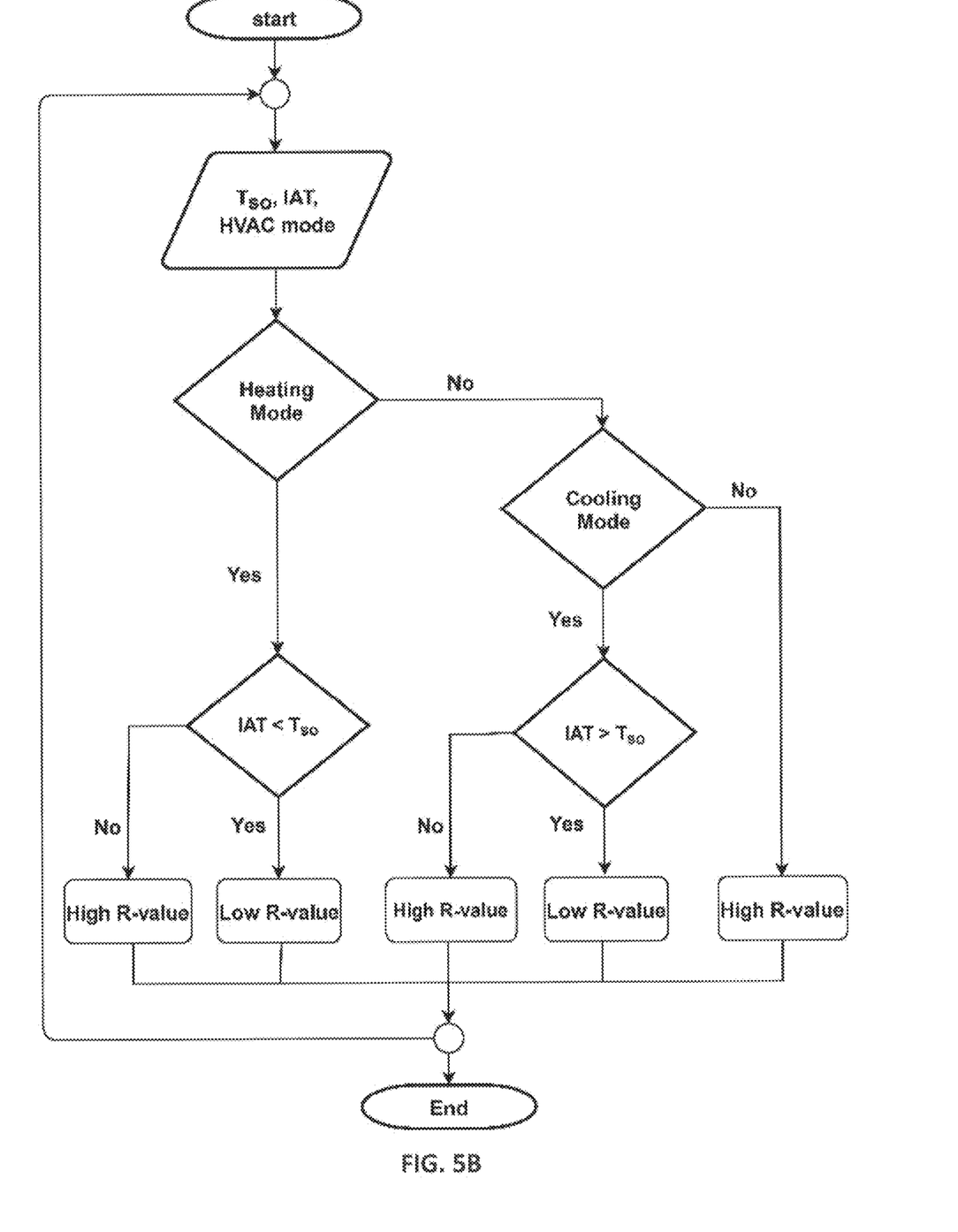

The temperature-based ruleset depicted in FIG. 5A operates only during times of heating/cooling needs to ensure adequate thermal comfort levels. However, this ruleset prevents the SPCMS from operating during some nighttime hours or weekends since the heating, ventilating and air conditioning (HVAC) system operates using setback/setup temperatures during unoccupied hours. The SPCMS technology is most beneficial during hours when outdoor temperatures become lower than indoor temperature settings during the cooling season occurring primarily at nighttime. Hence, another temperature-based ruleset (SPCMS: Ruleset 2) that excludes the HVAC operation mode condition is proposed as shown in FIG. 5B. Specifically, the SPCMS is controlled to switch to low R-value anytime during the day whenever the indoor temperature is higher than the roof/wall outside surface temperature regardless of whether cooling is needed, and the same is true for the heating season. The two temperature-based rulesets can be combined as illustrated in the weekly analysis (see, e.g., Section 2.1.2, APPENDIX). Thermal comfort during occupancy period is assessed to determine if ruleset 2 is suitable for application during weekdays, otherwise it is used during weekends since there is no occupancy and maintaining indoor thermal comfort is not required.

Figure 6:
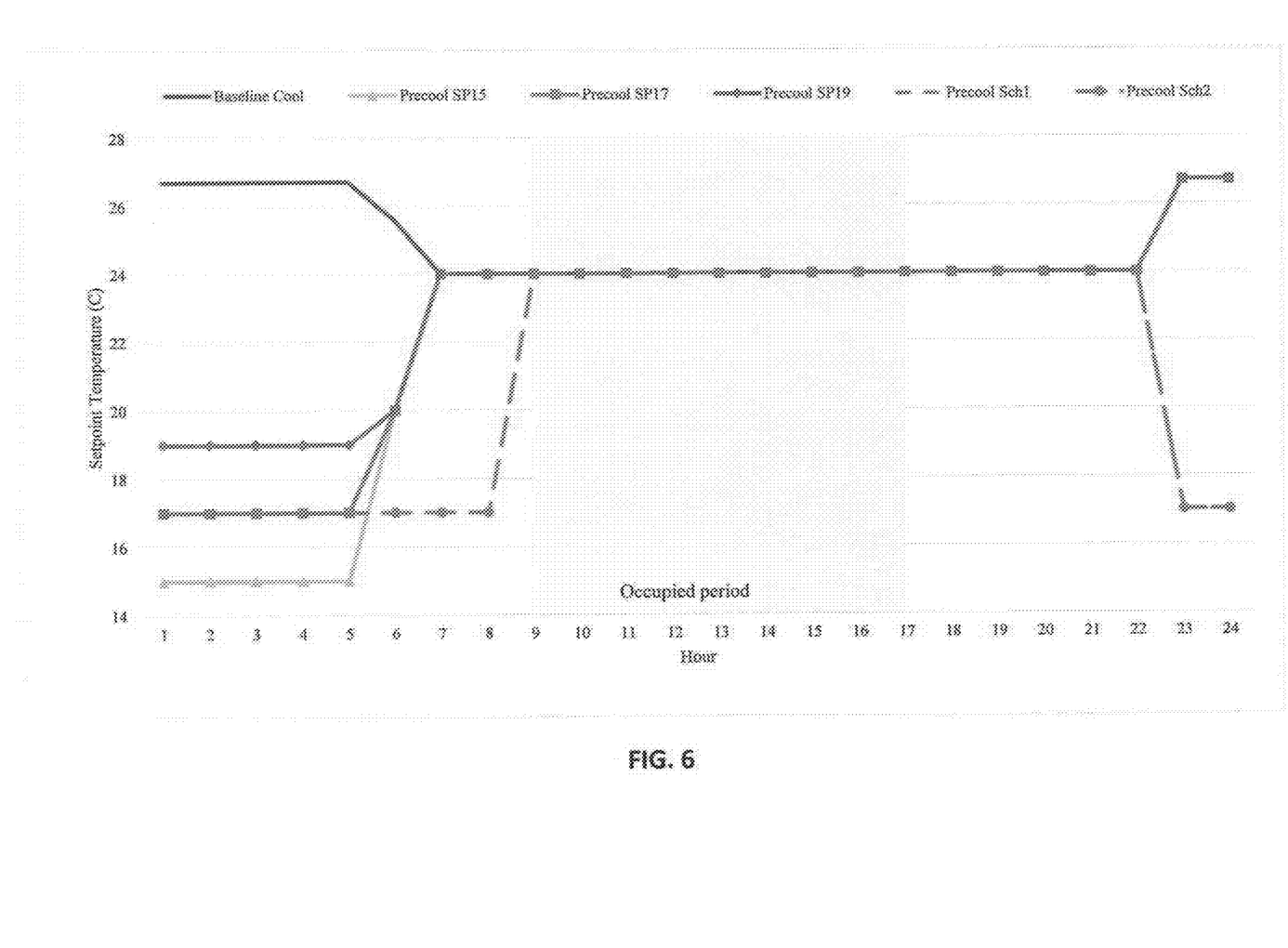
FIG. 6 is a graph showing a summary of precooling sensitivity analyses for an example SPCMS.

Precooling strategies are recognized as efficient controls for commercial buildings to reduce cooling energy during on-peak hours and shift peak demands to off-peak hours specially when variable electricity pricing schemes are applied (i.e., TOU and RTP). Three parameters primarily define a precooling strategy including the starting hour, the length of precooling period, and the temperature setpoint. A sensitivity analysis has been carried out to assess the impact of each precooling parameter on the performance of roof SPCMS. Typically, precooling is employed during unoccupied hours that extend from early morning until occupancy starts. Sometimes, however, nighttime hours can be considered to precool the building to lower/shift its peak demand for the next day. The precooling setpoint temperature is another important factor considered in the analysis that influences the amount of stored cooling energy. A summary of the precooling sensitivity analyses is illustrated in FIG. 6. In the baseline model, the cooling setpoint temperature is set at 26.7° C. (i.e., a setup temperature setting) during nighttime hours (11 PM-5 AM) and then drops linearly to 24° C. at 7 AM and remains the same until 10 PM. For most of the scenarios, the cooling setpoint is maintained constant at 24° C. from 7 AM to 10 PM and precooling ends few hours before occupancy to ensure adequate thermal comfort levels. Details of an analysis of various control and design scenarios is also provided in the attached APPENDIX.

Table 1, below, illustrates example control and design scenarios for operating an SPCMS according to principles described herein for a given day.

| Scenario | Name | Description |
|---|---|---|
| S-0 | Baseline | Baseline building model |
| S-1 | SPCMS: Ruleset 1 | Deploying SPCMS with temperature-based control strategy as depicted in FIG. 5A |
| S-2 | SPCMS: Ruleset 2 | Deploying SPCMS with temp-based control strategy as depicted in FIG. 5B |

-continued

| Scenario | Name | Description |
| --- | --- | --- |
| S-3 | Precool SP15 | Precooling the building to 15° C. for 5 hours before occupancy (12 AM-5 AM) |
| S-4 | Precool SP17 | Precooling the building to 17° C. for 5 hours before occupancy (12 AM-5 AM) |
| S-5 | Precool SP19 | Precooling the building to 19° C. for 5 hours before occupancy (12 AM-5 AM) |
| S-6 | Precool Sch1 | S-4 + extending the precooling period to 7 hours (10 PM-5 AM) |
| S-7 | Precool Sch2 | S-4 + extending the precooling period to 10 hours (10 PM-8 AM) |
| S-8 | Precool LTM | S-6 + low internal thermal mass level, 112 kg/m$^2$ (23 lb/ft$^2$) |
| S-9 | Precool MTM | S-6 + medium internal thermal mass level, 317 kg/m$^2$ (65 lb/ft$^2$) |
| S-10 | Precool HTM | S-6 + high internal thermal mass level, 708 kg/m$^2$ (145 lb/ft$^2$) |
| S-11 | Optimal SPCMS | Deploying SPCMS using GA optimal controls considering energy use as the cost function |

Figure 7A:
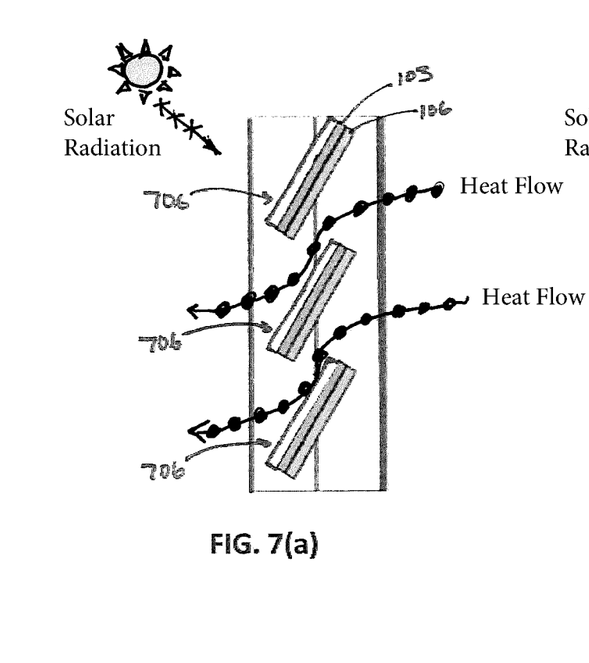
FIG. 7 illustrates an embodiment of an SPCMS with a second insulation layer, according to principles described herein.
Figure 7B:
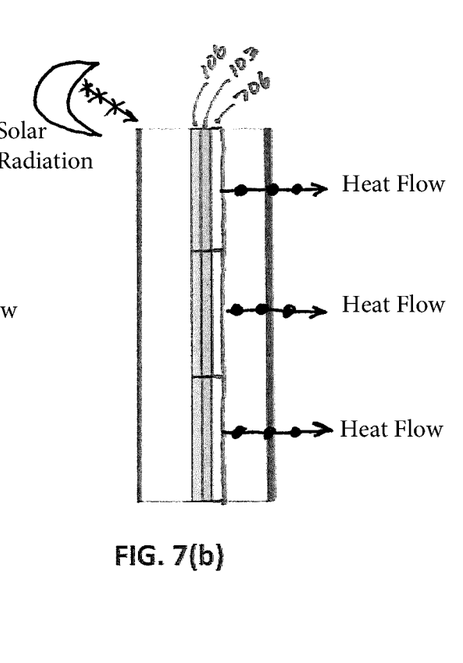
Figure 7C:
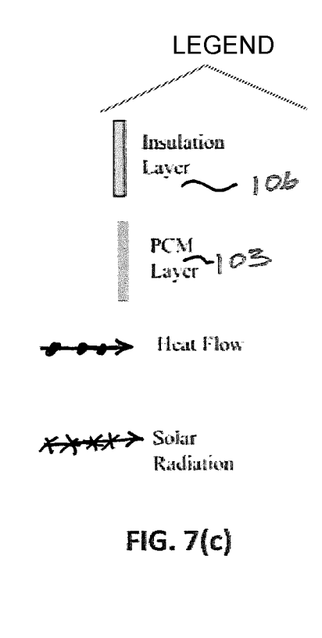

In another embodiment according to principles described herein, a phase change material may be in a panel, but sandwiched between insulation layers having different R values. For example, referring to FIGS. 7(a) and 7(b), a second insulation layer 706 with a low R value (relative to the first insulation layer) is on a side of the PCM layer such that heat may still transfer through the second insulation layer 706 to the PCM material 103. In other words, each panel 702 comprises two insulation layers, 706 and 106, and a PCM layer 103 therebetween. Rotation of the panels 102 may then proceed as described throughout this specification.

As can be appreciated, without limitation, any of the SPCMS designs described herein can be prefabricated for installation into a structure, incorporated in modular building materials, such as prefabricated components, or can be custom installed in a building, e.g. during construction.

For example, According to principles described herein, the system includes at least one movable panel, the panel having a first side and a second side; a phase change material provided on the first side of the moveable panel; an insulation material provided on the second side of the moveable panel; an actuator coupled to the at least one moveable panel; wherein the movable panel is moveable between a first orientation and a second orientation by operation of the actuator such that the PCM material is oriented in a first direction and the insulation material is oriented in a second direction.

In an aspect, the heat exchange system for a structure the first orientation is 180 degrees from the second orientation.

In another aspect, the system also includes a frame, wherein the at least one moveable panel is coupled to the frame.

In another aspect, the system also includes a rod coupled to the at least one moveable panel, whereby rotation of the rod causes movement of the movable panel between 0 degrees and 180 degrees. The rod may be a central axis of rotation of the moveable panel. The rod may be an edge axis of rotation of the moveable panel.

The PCM material may be paraffins, fatty acids, and/or hydrated salts.

Any of the embodiment described herein may have a plurality of the moveable panels. Each of moveable panels may have an axis of rotation for moving between the 0 degree orientation and the 180 degree orientation, wherein the axes of rotation of the plurality of moveable panels are generally parallel.

Figure 8:
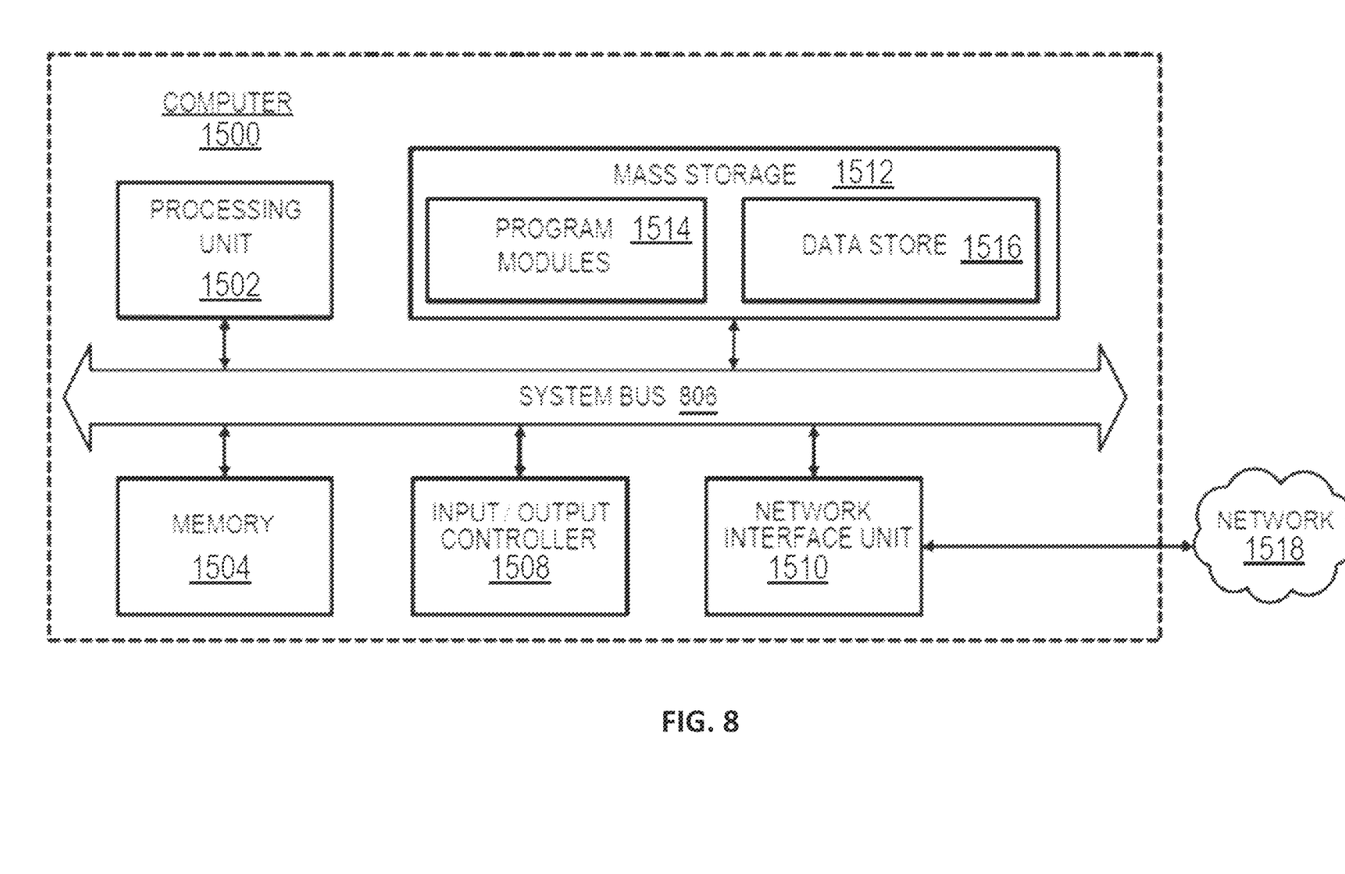
FIG. 8 is a computer architecture diagram showing a general computing system capable of implementing one or more embodiments of the present disclosure described herein.

The system may include a programmable controller coupled to the actuator for causing movement of the moveable panel. FIG. 8 is a computer architecture diagram showing a general computing system capable of implementing one or more embodiments of the present disclosure described herein. The controller as described herein with respect to various embodiments may include some or all of the components of computer 1500

As shown, the computer 1500 includes a processing unit 1502, a system memory 1504, and a system bus 1506 that couples the memory 1504 to the processing unit 1502. The computer 1500 further includes a mass storage device 1512 for storing program modules. The program modules 1514 may include modules executable to perform one or more functions associated with embodiments illustrated in other Figures of the present disclosure. The mass storage device 1512 further includes a data store 1516.

The mass storage device 1512 is connected to the processing unit 1502 through a mass storage controller (not shown) connected to the bus 1506. The mass storage device 1512 and its associated computer storage media provide non-volatile storage for the computer 1500. By way of example, and not limitation, computer-readable storage media (also referred to herein as "computer-readable storage media" or "computer-storage media" or "computer-storage medium") may include volatile and non-volatile, removable and non-removable media implemented in any method or technology for storage of information such as computer-storage instructions, data structures, program modules, or other data. Computer-readable storage media as described herein does not include transitory signals.

According to various embodiments, the computer 1500 may operate in a networked environment using connections to other local or remote computers through a network 1518 via a network interface unit 1510 connected to the bus 1506. The network interface unit 1510 may facilitate connection of the computing device inputs and outputs to one or more suitable networks and/or connections such as a local area network (LAN), a wide area network (WAN), the Internet, a cellular network, a radio frequency network, a Bluetooth-enabled network, a Wi-Fi enabled network, a satellite-based network, or other wired and/or wireless networks for communication with external devices and/or systems.

The computer 1500 may also include an input/output controller 1508 for receiving and processing input from a number of input devices. Input devices may include, but are not limited to, keyboards, mice, stylus, touchscreens, microphones, audio capturing devices, or image/video capturing devices. An end user may utilize such input devices to interact with a user interface, for example a graphical user interface on one or more display devices (e.g., computer screens), for managing various functions performed by the computer 1500, and the input/output controller 1508 may be configured to manage output to one or more display devices for visually representing data. The bus 1506 may enable the processing unit 1502 to read code and/or data to/from the mass storage device 1512 or other computer-storage media. The computer-storage media may represent apparatus in the form of storage elements that are implemented using any suitable technology, including but not limited to semiconductors, magnetic materials, optics, or the like. The program modules 1514 may include software instructions that, when loaded into the processing unit 1502 and executed, cause the computer 1500 to provide functions associated with embodiments illustrated and described herein. The program modules 1514 may also provide various tools or techniques by which the computer 1500 may participate within the overall systems or operating environments using the components, flows, and data structures discussed throughout this description. In general, the program module 1514 may, when loaded into the processing unit 1502 and executed, transform the processing unit 1502 and the overall computer 1500 from a general-purpose computing system into a special-purpose computing system.

In some aspects, the present disclosure relates to dynamic, switchable phase change material (PCM) systems. Among other benefits and advantages provided, switchable PCM systems in accordance with some embodiments of the present disclosure allow building envelope assemblies to store energy from one side and release to the other side in order to reduce thermal loads and peak demands for both space heating and cooling. Moreover, PCM layers can be coupled with thermal insulation layers to ensure heat does not transfer readily through the building envelope and thus increase thermal heating and cooling loads for the building. PCMs used in various embodiments of the present disclosure can be phase change materials suitable for building materials, including, but not limited to paraffins, fatty acids, and hydrated salts. In some embodiments of the present disclosure, a combination of rotatable members comprised of PCM layers and insulation layers are switchable in position such that the PCM layers are switched from one side to the other without the need to maintain the thermal insulation within a building envelope such as a wall assembly. Dynamic systems in accordance with various embodiments of the present disclosure can significantly reduce annual combined cooling and heating energy use for residential and commercial buildings, for a wide range of climates.

In some aspects, the present disclosure relates to a switchable phase change material system for a building envelope. In some embodiments, the system comprises a rotatable member including a phase change material, disposed in a building envelope. An angular position of the rotatable member is switchable by rotating the rotatable member about a rotation axis, and the angular position is determined at least in part based on considerations that include indoor-outdoor thermal interactions associated with the building envelope.

In some embodiments, the angular position of the rotatable member is switchable by rotating the rotatable member such that the phase change material moves from a first position in which the phase change material faces in a first direction to a second position in which the phase change material faces in a second direction. In some embodiments, the first direction is about 180 degrees from the second direction. In some embodiments, the phase change material comprises at least one of paraffins, fatty acids, and hydrated salts. In some embodiments, the rotatable member comprises at least one layer of phase change material and at least one layer of insulation material.

In some embodiments, the rotatable member is configured to selectively store and release thermal energy. In some embodiments, the angular position of the rotatable member affects at least one of: heating and/or cooling of the building; and energy usage of the building.

In some embodiments, the switchable phase change material system further comprises an actuator coupled to the rotatable member and configured to cause the rotatable member to change the angular position by rotating about the rotation axis.

In some embodiments, the switchable phase change material system further comprises a controller configured to control the actuator to cause the actuator to change the angular position of the rotatable member. In some embodiments, the control of the actuator by the controller is determined, at least in part, according to the considerations that include indoor-outdoor thermal interactions associated with the building envelope. In some embodiments, the control of the actuator by the controller is determined, at least in part, according to temperature sensed by temperature sensors associated with the building envelope.

In another aspect, the present disclosure relates to a method of affecting thermal conditions of a building, using a system according to any one of the above-described embodiments.

Numerous characteristics and advantages provided by aspects of the present disclosure have been set forth in the foregoing description. The patentable scope of certain embodiments is set forth in the appended claims and claims of non-provisional patent application(s) to be filed claiming priority to the present Application. While the present disclosure is disclosed in several forms herein, it will be apparent to those skilled in the art that many modifications can be made therein without departing from the spirit and scope of the present disclosure and its equivalents. Therefore, other modifications or embodiments as may be suggested by the teachings herein are particularly reserved.

It will be apparent to those skilled in the art that various modifications and variations can be made in the present disclosure without departing from the scope or spirit of the present disclosure. Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the appended claims.

LIST OF REFERENCES

[1] Soares, N., Costa, J. J., Gaspar, A. R., and Santos, P., 2013, Review of passive PCM latent heat thermal energy storage systems towards buildings' energy efficiency, Energy and Buildings, 59. 82-103.

[2] Kalnaes, S. E., and Jelle, B. P., 2015, Phase change materials and products for building applications: A state-of-the-art review and future research opportunities, Energy and Buildings, 94, 150-176.

[3] Jin, X., Medina, M. A., and Xhang, X., 2016, Numerical analysis for the optimal location of a thin PCM layer in frame walls, Applied Thermal Engineering, 103, 1057-1063.

[4] Al-Absi, A. A., Isa, M. H. M., and Ismail, M., 2020, Phase change materials (PCMs) and their optimum position in buildings walls, Sustainability, 12, 1294.

What is claimed is:

1. A heat exchange system for a structure, the system comprising:

at least one movable panel, the at least one moveable panel comprising: a first insulation layer having a first R value, a phase change material (PCM) layer; and a second insulation layer having a second R value different from the first R value, wherein the PCM layer is between the first insulation layer and the second insulation layer;

an actuator coupled to the at least one moveable panel;

wherein the at least one movable panel is moveable between a first orientation and a second orientation by operation of the actuator such that the first insulation layer is oriented in a first direction under a first condition and the first insulation layer is oriented in a second direction under a second condition.

2. The heat exchange system for a structure of claim 1, wherein the first orientation is 180 degrees from the second orientation.

3. The heat exchange system of claim 1, further comprising a frame, wherein the at least one moveable panel is coupled to the frame.

4. The heat exchange system for a structure of claim 1, further comprising a rod coupled to the at least one moveable panel, whereby rotation of the rod causes movement of the movable panel between 0 degrees and 180 degrees.

5. The heat exchange system of claim 4, wherein the rod comprises a central axis of rotation of the at least one moveable panel.

6. The heat exchange system of claim 4, wherein the rod comprises an edge axis of rotation of the at least one moveable panel.

7. The heat exchange system for a structure of claim 1, wherein the PCM material comprises at least one of paraffins, fatty acids, and hydrated salts.

8. The system of claim 1, wherein the at least one moveable panel is a plurality of moveable panels.

9. The system of claim 8, wherein each of the plurality of moveable panels comprises an axis of rotation for moving between the 0 degree orientation and the 180 degree orientation, wherein the axes of rotation of the plurality of moveable panels are generally parallel.

10. The system of claim 1, further comprising an electronic controller coupled to the actuator and configured to control movement of the at least one moveable panel.

11. The system of claim 1, wherein the first direction is toward an interior of the building envelope.

12. The system of claim 1, wherein the first direction is toward an exterior of the building envelope.

13. The system of claim 1, wherein the first condition is a temperature inside said structure is greater than a temperature outside said structure and the second condition is a is the temperature inside said structure is less than the temperature outside said structure.

14. The system of claim 1, wherein movement of the at least one panel by operation of the actuator is controlled according to a temperature-based control strategy.

15. The system of claim 14, wherein the temperature-based control strategy is implemented by ruleset implemented in a controller coupled to the actuator.

16. A switchable phase change material system for a building envelope, the system comprising:
a rotatable member comprising a phase change material (PCM), a first insulation layer having a first R value, a second insulation layer having a second R value, wherein the PCM material is in a layer between the first insulation layer and the second insulation layer and wherein the rotatable member is disposed in a building envelope, wherein an angular position of the rotatable member is switchable by rotating the rotatable member about a rotation axis, and wherein the angular position is determined at least in part based on considerations that include indoor-outdoor thermal interactions associated with the building envelope.

17. The system of claim 16, wherein the angular position of the rotatable member is switchable by rotating the rotatable member such that the first insulation layer moves from a first position in which the first insulation layer faces in a first direction to a second position in which the first insulation layer faces in a second direction.

18. The system of claim 17, wherein the first direction is about 180 degrees from the second direction.

19. The system of claim 16, wherein the phase change material comprises at least one of paraffins, fatty acids, and hydrated salts.

20. The system of claim 16, wherein the angular position of the rotatable member affects at least one of:
heating and/or cooling of the building; and
energy usage of the building.

21. The system of claim 16, further comprising:
an actuator coupled to the rotatable member and configured to cause the rotatable member to change the angular position by rotating about the rotation axis.

22. The system of claim 21, further comprising a controller configured to control the actuator, to cause the actuator to change the angular position of the rotatable member.

23. The system of claim 22, wherein the control of the actuator by the controller is determined, at least in part, according to the considerations that include indoor-outdoor thermal interactions associated with the building envelope such that the first insulation layer is oriented in a first direction under a first thermal condition and the first insulation layer is oriented in a second direction under a second thermal condition.

24. The system of claim 23, wherein the first direction is toward an interior of the building envelope.

25. The system of claim 23, wherein the first direction is toward an exterior of the building envelope.

26. The system of claim 23, wherein the first condition is a temperature inside said structure is greater than a temperature outside said structure and the second condition is a is the temperature inside said structure is less than the temperature outside said structure.

27. The system of claim 21, wherein the control of the actuator by the controller is determined, at least in part, according to temperature sensed by temperature sensors associated with the building envelope.

28. The system of claim 16, wherein movement of the at least one panel by operation of the actuator is controlled according to a temperature-based control strategy.

29. The system of claim 28, wherein the temperature-based control strategy is implemented by ruleset implemented in a controller coupled to the actuator.

* * * * *